US009805545B2

(12) United States Patent
Keilwert et al.

(10) Patent No.: US 9,805,545 B2
(45) Date of Patent: Oct. 31, 2017

(54) CASINO ELECTRONIC GAMING MACHINE CABINET WITH MOBILE DEVICE DOCK AND RELATED TECHNIQUES

(71) Applicant: IGT Canada Solutions ULC, Moncton (CA)

(72) Inventors: Stefan Keilwert, St. Josef (AT); James William Morrow, Reno, NV (US)

(73) Assignee: IGT CANADA SOLUTIONS ULC, Moncton (CA)

( * ) Notice: Subject to any disclaimer, the term of this patent is extended or adjusted under 35 U.S.C. 154(b) by 20 days.

(21) Appl. No.: 14/966,525

(22) Filed: Dec. 11, 2015

(65) Prior Publication Data

US 2017/0169657 A1 Jun. 15, 2017

(51) Int. Cl.
*A63F 13/00* (2014.01)
*G07F 17/32* (2006.01)

(52) U.S. Cl.
CPC ...... *G07F 17/3225* (2013.01); *G07F 17/3206* (2013.01); *G07F 17/3209* (2013.01); *G07F 17/3211* (2013.01); *G07F 17/3246* (2013.01); *G07F 17/3251* (2013.01); *G07F 17/3216* (2013.01)

(58) Field of Classification Search
None
See application file for complete search history.

(56) References Cited

U.S. PATENT DOCUMENTS 6,846,238 B2 1/2005 Wells
8,496,530 B2 7/2013 Dean
9,011,240 B2 4/2015 Froy, Jr. et al.
9,123,200 B2 9/2015 Froy, Jr. et al.
9,129,489 B2 9/2015 Froy, Jr. et al.
9,146,083 B2 9/2015 Lamothe
9,159,189 B2 10/2015 Froy, Jr. et al.
9,208,641 B2 12/2015 Froy, Jr. et al.
9,269,222 B2 2/2016 Froy, Jr. et al.
9,280,868 B2 3/2016 Froy et al.
(Continued)

OTHER PUBLICATIONS

U.S. Appl. No. 14/573,503, filed Dec. 17, 2014, Idris.
(Continued)

*Primary Examiner* — Jason Yen
(74) *Attorney, Agent, or Firm* — Sage Patent Group

(57) ABSTRACT

A casino electronic gaming machine cabinet includes at least one display screen, multiple input controls, a dock configured to receive a player's mobile device, at least one communication interface capable of electronic communication with the player's mobile device via the dock while the mobile device executes wagering game software, and control circuitry to receive wagering game input commands entered by the player via the input controls of the casino electronic gaming machine cabinet, transmit, to the player's mobile device via the at least one communication interface while the player's mobile device is docked at the casino electronic gaming machine cabinet, control signals corresponding to the received wagering game input commands. The control signals provide control input to the wagering game software, receive from the player's docked mobile device, graphics output from the wagering game software providing visual components of the wagering game play.

19 Claims, 5 Drawing Sheets

(56) References Cited

U.S. PATENT DOCUMENTS

| | | | | |
|---|---|---|---|---|
| 9,295,908 | B2 | 3/2016 | Froy et al. | |
| 2003/0064805 | A1 | 4/2003 | Wells | |
| 2007/0259716 | A1 * | 11/2007 | Mattice | G06F 3/013 463/36 |
| 2008/0273734 | A1 * | 11/2008 | Solland | G06F 1/1632 381/334 |
| 2008/0311971 | A1 * | 12/2008 | Dean | G07F 17/32 463/20 |
| 2009/0098925 | A1 * | 4/2009 | Gagner | G07F 17/32 463/20 |
| 2013/0059650 | A1 * | 3/2013 | Sylla | G07F 17/32 463/25 |
| 2013/0267324 | A1 | 10/2013 | Froy, Jr. et al. | |
| 2013/0267325 | A1 | 10/2013 | Froy, Jr. et al. | |
| 2013/0267326 | A1 | 10/2013 | Froy et al. | |
| 2013/0267327 | A1 | 10/2013 | Froy, Jr. et al. | |
| 2013/0273996 | A1 | 10/2013 | Froy, Jr. et al. | |
| 2013/0273998 | A1 | 10/2013 | Froy, Jr. et al. | |
| 2013/0310159 | A1 | 11/2013 | Froy et al. | |
| 2013/0310160 | A1 | 11/2013 | Froy et al. | |
| 2013/0337878 | A1 * | 12/2013 | Shepherd | G07F 17/3223 463/11 |
| 2013/0337895 | A1 | 12/2013 | Froy et al. | |
| 2014/0066179 | A1 | 3/2014 | Froy et al. | |
| 2014/0162762 | A1 * | 6/2014 | Aoki | G07F 17/3218 463/25 |
| 2014/0213350 | A1 | 7/2014 | Froy et al. | |
| 2014/0274309 | A1 * | 9/2014 | Nguyen | G07F 17/3241 463/25 |
| 2015/0028546 | A1 | 1/2015 | Lamothe | |
| 2015/0138094 | A1 | 5/2015 | Kim | |

OTHER PUBLICATIONS

U.S. Appl. No. 14/747,426, filed Jun. 23, 2015, Froy.

[No Author Listed] Samsung invents a Phablet Dock for a Next-Gen Dual OS Notebook. Patently Mobile. May 23, 2015 http://www.patentlymobile.com/2015/05/samsung-invents-a-phablet-dock-for-a-next-gen-dual-os-notebook.html [last accessed Oct. 7, 2015 ]. 8 pages.

* cited by examiner

CASINO ELECTRONIC GAMING MACHINE CABINET WITH MOBILE DEVICE DOCK AND RELATED TECHNIQUES

BACKGROUND

Modern casinos are increasingly moving toward electronic and computerized implementations for their gaming machines. For example, slot machines historically were mechanical devices whose physical reels could be spun by pulling a lever on the side of the machine. Each symbol on each reel occupied a physical stop having the same probability of occurrence as all other stops on the reel, and the machine would pay out based on the combination of symbols appearing in a line across the reels (the "payline") when all of the reels stopped spinning. Today, however, mechanical reels in slot machines are typically controlled electronically, such that different payline probabilities can be assigned to different symbols on the reels. The reels can be spun by pushing a button that activates the electronic control, although some machines may retain the traditional lever for entertainment value. In newer video slot machines, the physical reels are replaced by virtual reels whose symbols are displayed on a video screen, controlled by one or more computer processors. Some video slot machines have physical buttons for the player to press, while others are operated via touchscreen.

An electronic gaming machine is typically programmed, via software or firmware, to pay out as winnings, in the long run, a particular percentage of the money that is paid in by players as wagers. This is typically done by setting the probabilities for individual payouts in the machine's control system. For example, if a machine gives a payout of 10 times the player's wager with a probability of 5%, and a payout of 20 times the player's wager with a probability of 2%, then the machine has a theoretical payout percentage (also known as the "return to player" (RTP)) of 90%. The remaining 10% of the wagers are kept by the "house" (i.e., the slot machine operator—typically the casino) as profits. The payouts that result from various combinations of symbols appearing on a payline when the reels stop spinning are typically listed in a pay table that may be displayed somewhere on the machine. The probability of each payout can thus be controlled by setting the probabilities of the individual symbols that must co-occur on the payline to produce that payout.

SUMMARY

One type of embodiment is directed to a casino electronic gaming machine cabinet comprising: at least one display screen; a plurality of input controls; a dock configured to receive a player's mobile device; at least one communication interface capable of electronic communication with the player's mobile device via the dock while the mobile device executes wagering game software providing wagering game play to the player; and control circuitry configured to: receive wagering game input commands entered by the player via the input controls of the casino electronic gaming machine cabinet; transmit, to the player's mobile device via the at least one communication interface while the player's mobile device is docked at the casino electronic gaming machine cabinet, control signals corresponding to the received wagering game input commands, the control signals being configured to provide control input to the wagering game software executing on the player's docked mobile device; receive from the player's docked mobile device, via the at least one communication interface, graphics output from the wagering game software providing visual components of the wagering game play; and display, on the at least one display screen of the casino electronic gaming machine cabinet, the graphics output from the wagering game software executing on the player's docked mobile device.

Another type of embodiment is directed to a method of providing wagering game play to a player having a mobile device in a casino venue, the method comprising: providing in the casino venue a casino electronic gaming machine cabinet comprising at least one display screen, a plurality of input controls, a dock configured to receive the player's mobile device, and at least one communication interface capable of electronic communication with the player's mobile device via the dock while the mobile device executes wagering game software providing wagering game play to the player; receiving, at the casino electronic gaming machine cabinet, wagering game input commands entered by the player via the input controls of the casino electronic gaming machine cabinet; transmitting, from the casino electronic gaming machine cabinet to the player's mobile device via the at least one communication interface while the player's mobile device is docked at the casino electronic gaming machine cabinet, control signals corresponding to the received wagering game input commands, the control signals being configured to provide control input to the wagering game software executing on the player's docked mobile device; receiving, at the casino electronic gaming machine cabinet from the player's docked mobile device via the at least one communication interface, graphics output from the wagering game software providing visual components of the wagering game play; and displaying, on the at least one display screen of the casino electronic gaming machine cabinet, the graphics output from the wagering game software executing on the player's docked mobile device.

Another type of embodiment is directed to at least one non-transitory processor-readable storage medium storing processor-executable instructions that, when executed by at least one processor of a player's mobile device, perform a method of providing wagering game play to the player while the mobile device is docked at a casino electronic gaming machine cabinet, the method comprising: receiving, from the casino electronic gaming machine cabinet, control signals corresponding to wagering game input commands entered by the player via input controls of the casino electronic gaming machine cabinet, the control signals being configured to provide control input to wagering game software executing on the docked mobile device; executing the wagering game software at the mobile device using the control input from the control signals received from the casino electronic gaming machine cabinet, wherein executing the wagering game software comprises performing at least one random number generation function in providing the wagering game play to the player; and transmitting, to the casino electronic gaming machine cabinet, graphics output from the wagering game software providing visual components of the wagering game play for display on a display of the casino electronic gaming machine cabinet.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
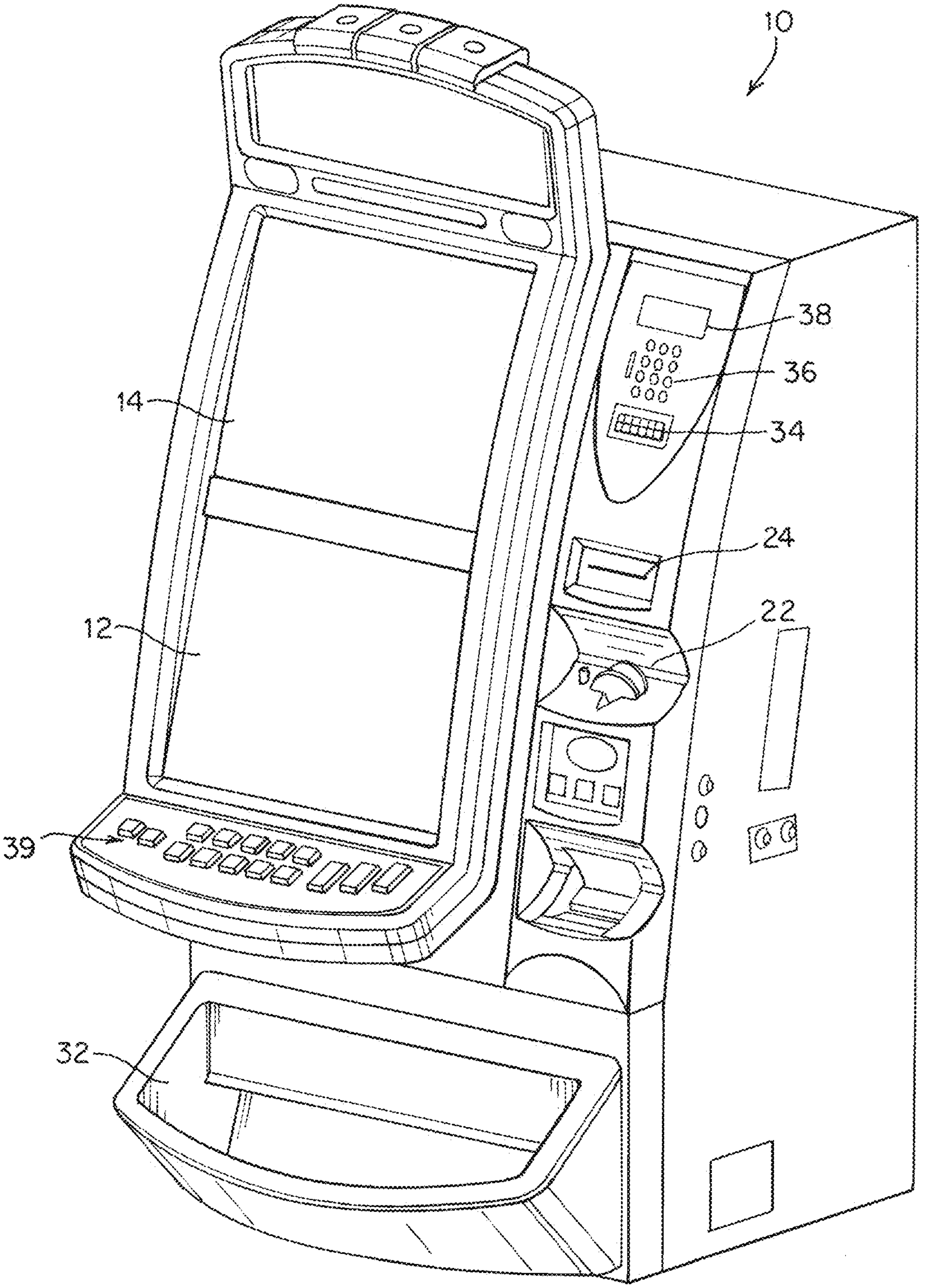
FIG. 1 is a perspective view illustrating an exemplary casino electronic gaming machine cabinet in accordance with some embodiments.

The inventors have appreciated that mobile computing devices have become ubiquitous and are a popular platform for playing wagering games. As used herein, a "mobile device" is any computing device designed to be operated while being carried by a user, and that runs an operating system and can be used to download and execute application programs. Mobile devices are typically small enough to be handheld. Examples of mobile devices today include tablet computers, smartphones, personal digital assistants (PDAs), handheld game consoles, etc. Mobile devices are being used today for playing all kinds of wagering games, individually and online.

The inventors have recognized, however, that playing wagering games on the small screen of a mobile device can sometimes be a poor substitute for the excitement and complete sensory experience of a true casino venue. Players of mobile wagering games may at times visit brick-and-mortar casinos to enjoy the lights, sounds, smells, the people, the shows, the food and drink, etc., that are not provided by mobile game play outside of the casino environment. Within a casino venue, players can select from a wide variety of hosted wagering games provided via electronic gaming machines with large, bright displays, exciting lighting and high-quality sound, engaging tactile experiences provided by buttons, levers, touchscreens, etc. Some modern casino electronic gaming machines provide even more immersive experiences, with 3D displays, gesture interfaces, haptic feedback, etc. However, the inventors have recognized that conventionally there has not been a way for mobile gamers to connect their mobile game play with their game play in a casino. The wagering games provided on conventional casino electronic gaming machines are separate from the wagering games played on a player's mobile device, and do not carry over, for example, the player's scores, preferences, skill levels, etc., from the mobile game play.

As described herein, the inventors have developed techniques for providing wagering game play in a casino venue via a player's mobile device docked to an electronic gaming machine cabinet in the casino venue. In some embodiments, the mobile device may provide the main processing power for executing the wagering game software, while the casino electronic gaming machine cabinet may provide input and/or output functionality, such as larger buttons and/or other input controls, larger higher-quality visual display, louder higher-quality sound, immersive technologies such as 3D display, gesture interfaces, haptic feedback, etc., that would not be available via the mobile device alone. In some embodiments, this may allow a player to dock his own mobile device at a casino electronic gaming machine cabinet, and experience in a more engaging manner the same wagering game that he has played previously on the mobile device on its own. In some embodiments, the casino electronic gaming machine cabinet may be configured to operate either independently as a stand-alone machine (executing programs providing wagering game play via its own processing resources) or with processing power provided by a docked mobile device. In other embodiments, the casino electronic gaming machine cabinet may be passive when no mobile device is docked, and may lack processing resources for providing wagering game play without a docked mobile device. The inventors have appreciated that in this way, passive casino electronic gaming machine cabinets may be made simpler and less expensive to produce, while various resources of players' mobile devices, including and in addition to processing resources, may be advantageously utilized in ways described below when a mobile device is docked at the casino electronic gaming machine cabinet.

It should be appreciated that the foregoing description is by way of example only, and embodiments are not limited to providing any or all of the above-described functionality, although some embodiments may provide some or all of the functionality described herein. Moreover, various embodiments are not limited to providing any of the benefits discussed above, and it should be appreciated that some embodiments may not provide any of the above-discussed benefits and/or may not address any of the above-discussed deficiencies that the inventors have recognized in conventional techniques.

The embodiments described herein can be implemented in any of numerous ways, and are not limited to any particular implementation techniques. Thus, while examples of specific implementation techniques are described below, it should be appreciated that the examples are provided merely for purposes of illustration, and that other implementations are possible.

One illustrative application for the techniques described herein is for use in a system for providing wagering game play to a player in a casino venue, making use of a mobile device in the player's possession. The mobile device in the player's possession may be a mobile device owned by the player and/or brought to the casino venue by the player, or may be a mobile device temporarily in the player's possession, such as a mobile device provided to the player by the casino venue, that the player may carry around the casino venue while in possession of it. Techniques described herein may be applied to any type of mobile computing device, including but not limited to a tablet computer, a smartphone, a PDA, a handheld gaming device, etc. In some embodiments, wagering game play may be provided via a casino electronic gaming machine cabinet at which the player's mobile device may be docked. However, in other embodiments, as described further below, wagering game play may be provided via the player's mobile device while the player carries the mobile device in the casino venue without necessarily being docked at a casino electronic gaming machine cabinet.

An exemplary casino electronic gaming machine cabinet 10 is illustrated in perspective view in FIG. 1. It should be appreciated that the configuration of casino electronic gaming machine cabinet 10 is merely one example configuration provided for purposes of illustration, and embodiments are not limited to the particular configuration illustrated in FIG. 1. Other exemplary embodiments of a casino electronic gaming machine cabinet may not include all of the components illustrated in exemplary cabinet 10, and/or may include additional components not shown in FIG. 1, and/or may include similar components arranged differently than illustrated in FIG. 1.

Exemplary cabinet 10, as depicted in FIG. 1, includes a display 12 that may be a thin film transistor (TFT) display, a liquid crystal display (LCD), a cathode ray tube (CRT) display, a light-emitting diode (LED) display, an organic LED (OLED) display, an autostereoscopic three dimensional (3D) display, or any other type of display. A second display 14 may provide game data or other information in addition to display 12. Display 14 may provide static information, such as an advertisement for the game, the rules of the game, pay tables, pay lines, and/or other information, and/or may even display the main game or a bonus game along with display 12. Alternatively, the area for display 14 may be a display glass for conveying information about the game. Display 12 may also include a camera for use, for example, in presenting an autostereoscopic 3D display.

Display 12 and/or display 14 may have a touch screen lamination that includes a transparent grid of conductors. A player touching the screen may change the capacitance between the conductors, and thereby the X-Y location of the touch on the screen may be determined. A processor within cabinet 10 may associate this X-Y location with a function to be performed. There may be an upper and lower multi-touch screen in accordance with some embodiments.

A coin slot 22 may accept coins or tokens in one or more denominations to generate credits within the casino electronic gaming machine for playing games. An input slot 24 for an optical reader and printer may receive machine readable printed tickets and may output printed tickets for use in cashless gaming.

A coin tray 32 may receive coins or tokens from a hopper (not shown) upon a win or upon the player cashing out. However, in some embodiments, the casino electronic gaming machine may not pay in cash, but may only issue a printed ticket for cashing in elsewhere. Alternatively, a stored value card may be loaded with credits based on a win, or may enable the assignment of credits to an account associated with a computer system, which may be a computer network-connected computer.

A card reader slot 34 may accept any of various types of cards, such as smart cards, magnetic strip cards, and/or other types of cards conveying machine readable information. The card reader may read the inserted card for player and/or credit information for cashless gaming. The card reader may read a magnetic code on a player tracking card, where the code uniquely identifies the player to the casino venue's host system. The code may be cross-referenced by the host system to any data related to the player, and such data may affect the games offered to the player by the casino venue. The card reader may also include an optical reader and printer for reading and printing coded barcodes and other information on a paper ticket. A card may also include credentials that enable the host system to access one or more accounts associated with a user. The account may be debited based on wagers by a user and credited based on a win.

A keypad 36 may accept player input, such as a personal identification number (PIN) and/or any other player information. A display 38 above keypad 36 may display a menu for instructions and/or other information, and/or may provide visual feedback of the keys pressed. The keypad 36 may be an input device such as a touchscreen, or dynamic digital button panel, in accordance with some embodiments.

Player control buttons 39 may include any buttons and/or other controllers usable for the play of the particular game or games offered via the casino electronic gaming machine cabinet, including, for example, a bet button, a repeat bet button, a spin reels (or play) button, a maximum bet button, a cash-out button, a display pay lines button, a display payout tables button, select icon buttons, and/or any other suitable button(s). In some embodiments, buttons 39 may be replaced by a touchscreen with virtual buttons. In some embodiments, touchless control gesture functionality may replace or coexist with buttons 39.

Figure 2:
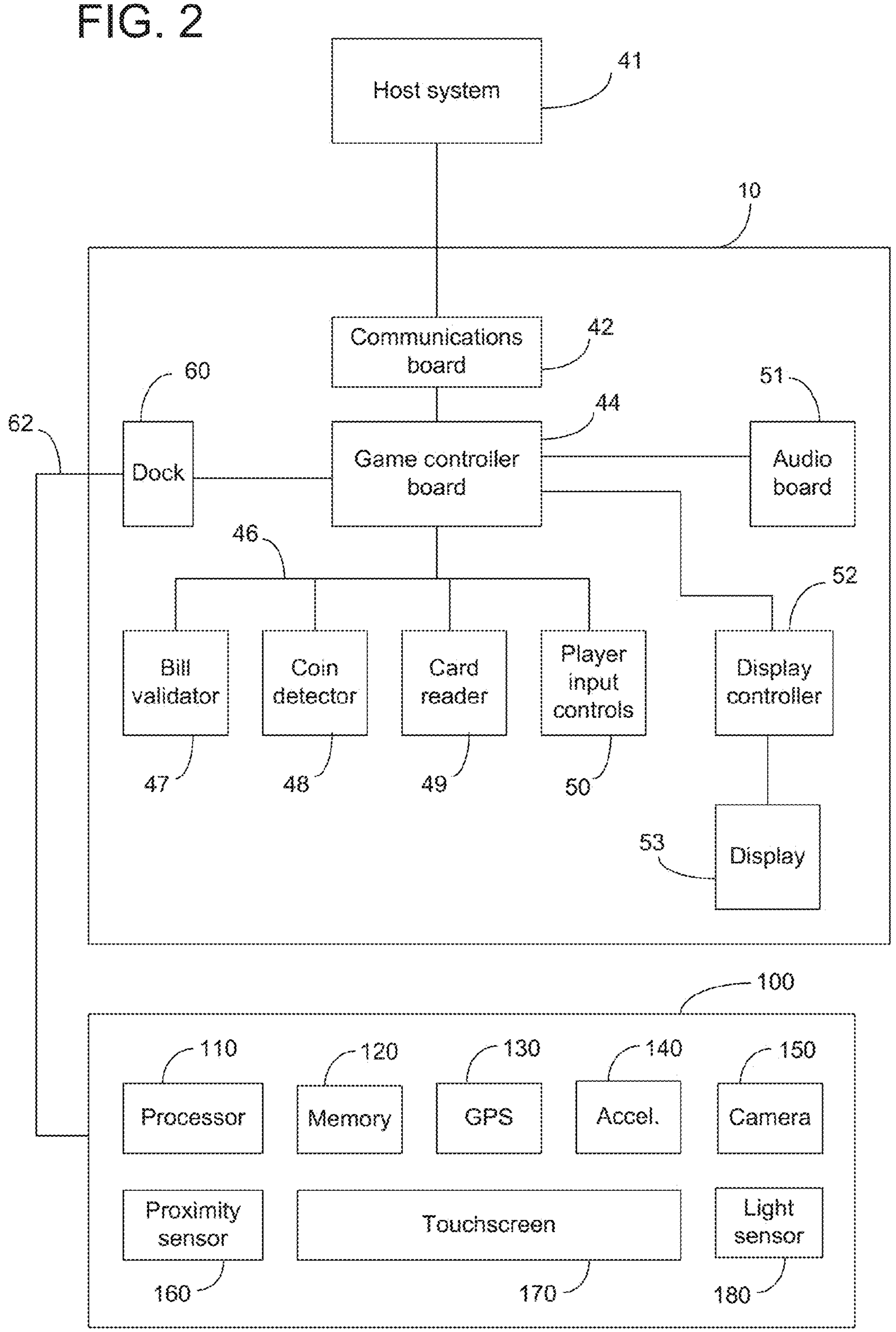
FIG. 2 is a block diagram of a casino electronic gaming machine cabinet with docked mobile device in accordance with some embodiments.

FIG. 2 is a block diagram showing further exemplary components of a casino electronic gaming machine such as may be housed in exemplary cabinet 10. It should be appreciated, again, that the configuration of components of casino electronic gaming machine cabinet 10 in FIG. 2 is merely one example configuration provided for purposes of illustration, and embodiments are not limited to the particular configuration illustrated in FIG. 2. Other exemplary embodiments of a casino electronic gaming machine cabinet may not include all of the components illustrated in exemplary cabinet 10, and/or may include additional components not shown in FIG. 2, and/or may include similar components arranged differently than illustrated in FIG. 2.

In this example, casino electronic gaming machine cabinet 10 is linked to a casino venue's host system 41. Such a link may be implemented in any suitable way. For example, a communications board 42 may contain circuitry for coupling the casino electronic gaming machine cabinet 10 to a local area network (LAN) and/or other type of network using any suitable protocol, such as the G2S protocols. Internet protocols are typically used for such communication under the G2S standard, incorporated herein by reference. Communications board 42 may transmit using a wireless transmitter, and/or may be directly connected to a network running throughout the casino floor. Communications board 42 may set up a communication link with a master controller and may buffer data between the network and game controller board 44. Communications board 42 may also communicate with a network server, such as in accordance with the G2S standard, for exchanging information to carry out embodiments described herein.

In some embodiments, host system 41 may be implemented as one or more server computing devices including one or more processors and memory (e.g., one or more processor-readable storage media) storing processor-executable instructions for causing the processor(s) to perform functions such as transmitting control commands to casino electronic gaming machine cabinets within the casino venue. For example, host system 41 may, through execution of stored program instructions by its processor(s), stream game content to casino electronic gaming machine cabinets and/or instruct casino electronic gaming machines to implement game adjustments selected by host system 41 at times determined by host system 41. In various embodiments, gaming functionality may be distributed between host system 41 and linked casino electronic gaming machine cabinets in any suitable way, making use of any suitable division of functionality. For instance, in some exemplary embodiments, host system 41 may download games to casino electronic gaming machine cabinets in the casino venue, which may execute the game programs including performing random number generation for determining probabilistic symbol outcomes. In other exemplary embodiments, host system 41 may perform random number generation and execute game programs for some or all of its linked casino electronic gaming machine cabinets, which may display output received from host system 41 and collect user input from players via input controls on the casino electronic gaming machine cabinet for transmission to host system 41 via network interfaces. In some embodiments, processing for providing wagering game play may be shared/distributed, such that, for example, host system 41 may perform some processing such as random number generation to determine game outcomes, while a processing device at casino electronic gaming machine cabinet 10 may perform some other processing such as rendering the display of game components such as reels, symbols, playing pieces, messages, etc. However, a link to a casino venue's host system is not required in all embodiments, and some embodiments may implement casino electronic gaming machine cabinet 10 as a stand-alone machine not connected to any external and/or centralized computing system of the casino venue.

In some embodiments, a wagering game presented via a casino electronic gaming machine cabinet may include a reel-spinning game. The form of play of the reel-spinning game may be to virtually spin a set of virtual reels having various symbols located at regularly spaced intervals ("stops") on the reels. Portions of the virtual reels may be depicted on a display screen of the casino electronic gaming machine cabinet as if the physical reels were placed side-by-side behind a window that leaves only a limited number of symbols on each reel visible through the window at any time. The player may place a wager on one or more paylines, each forming a pattern of symbol locations within the window on the reels. When the reels are spun, the symbols that appear in the window on the display when the reels stop spinning may be checked along each of the paylines on which a wager was placed, to determine whether any winning symbol combinations occur on those paylines to result in a win (and possible payout) for the player.

In some embodiments, each reel may be represented in memory as a data structure including a list of the symbols on that reel along with any suitable data sufficient to determine which symbols will appear in the display window each time the reel is spun. For example, in some embodiments, a reel may be represented as a data structure including a list of all of the virtual stops on the reel, with an individual symbol assigned to each stop. When the virtual reel is spun, a system processor may execute a random number generation function to select one of the virtual stops at random, with each of the virtual stops having an equal probability of selection. One or more system processors may execute an animation routine to simulate the reel spinning on the display of the casino electronic gaming machine cabinet, and then display the symbols listed in the data structure as occurring at the selected virtual stop when the animation concludes and the virtual reel stops spinning. In this case, the probability of a particular symbol appearing when the virtual reel is spun may be determined by the number of virtual stops on the reel occupied by that particular symbol. In another example, a reel may be represented in memory as a data structure listing each possible symbol only once, in association with a different occurrence probability for each symbol. For example, a reel could be defined to have the J symbol occur with 50% probability, the Q symbol with 30% probability, and the K symbol with 20% probability. When the reel is spun, a random number may be generated for each symbol position appearing on the display for that reel, and the symbol depicted for that position when the reel stops spinning may be selected by comparing the generated random number with the probabilities stored in the data structure for that reel. For example, if the random number is between 0 and 0.5, the J symbol may be displayed; if the random number is between 0.5 and 0.8, the Q symbol may be displayed; and if the random number is between 0.8 and 1, the K symbol may be displayed. Other examples are possible, and embodiments are not limited to any particular form of data structure for representing a virtual reel. In yet another example, the data structure may list, instead of individual symbols, all possible symbol sequences that could appear in a display window of a particular size for that reel, along with an occurrence probability for each symbol sequence.

Typically in a reel-spinning game, the amount of winnings that a player receives as a payout resulting from a given reel spin depends on which paylines the player has placed wagers on, which symbols occur on those paylines when the reels stop spinning, and how much that particular combination or pattern of symbols pays. In some embodiments, the set of available paylines and the mappings from particular symbol combinations to particular payouts may be stored in memory in any suitable form of data structure, and the system may access these data at the conclusion of a reel spin to determine whether any winning combinations have occurred on paylines on which the player has wagered, and to compute the amount of any applicable payout to award to the player. The possible winning symbol combinations and the amounts of their corresponding payouts may also be provided to the player in the form of a pay table, to inform the player as to what symbol combinations and payouts the player could hope to achieve by continued play of the reel-spinning game. For instance, in one example the combination of three bell symbols occurring in a row could be defined in the pay table as a winning combination. The amount of the payout listed in the pay table and stored in memory for a particular winning symbol combination may be set in any suitable form, such as an absolute monetary amount, or a multiple of the player's wager on the payline. Likewise, the payout may be awarded to the player in any suitable way, such as by physically releasing currency and/or tokens from the casino electronic gaming machine cabinet, by digitally adding the payout to any form of stored value card, by crediting the player's electronic account for access to the money elsewhere than the casino electronic gaming machine cabinet, by authorizing the player for an equivalent number of free casino games, and/or in any other suitable way.

In some embodiments, one or more bonus rounds of the reel-spinning game may be triggered by any suitable bonus-triggering event from the main portion of the game, such as the occurrence of a particular symbol or combination of symbols. Bonus triggers are not necessarily limited to symbol occurrences, however; other examples of suitable bonus-triggering events may include reaching a particular amount of total winnings in the reel-spinning game, completing a particular number of reel spins in the main game, applying a bonus credit received from another game or a promotion in the casino, etc.

Game controller board 44 of exemplary casino electronic gaming machine cabinet 10 in FIG. 2 may contain, in some embodiments, memory and one or more processors for carrying out programs stored in the memory and for providing information requested by the network. Game controller board 44 in some embodiments may execute programs stored in the memory and/or instructions received from host system 41 to carry out game routines, such as, in some exemplary embodiments, some or all of the routines described above for providing reel-spinning wagering game play to a player (e.g., random number generation for outcome determination, reel-spinning animation, etc.). However, in some embodiments, game controller board 44 may not be configured to provide wagering game play without the use of processing resources provided by a player's mobile device. In some embodiments, casino electronic gaming machine cabinet 10 may not be configured to provide wagering game play on its own absent the use of processing resources of a player's mobile device. In fact, in some embodiments, no component of the casino electronic gaming machine cabinet 10 may be configured to provide wagering game play when no mobile device is docked at the cabinet 10. For example, in some embodiments, game controller board 44 may be programmed to perform functions that work in cooperation with functions performed by the player's mobile device to provide wagering game play via, e.g., audio/visual output of the casino electronic gaming machine cabinet 10. However, game controller board 44 may not be programmed with the functions necessary to provide wagering game play in the absence of a docked mobile device in some embodiments.

Peripheral devices/boards may communicate with game controller board 44 via a bus 46 using, for example, an RS-232 interface. Such peripherals may include a bill validator 47, a coin detector 48, a smart card reader and/or other type of credit card reader 49, and/or player input controls 50 (such as buttons 39 and/or a touchscreen), etc.

Game controller board 44 may also control one or more devices that produce the game output including audio and/or video output associated with a particular game that is presented to the user. For example, audio board 51 may convert coded signals into analog signals for driving speakers. Display controller 52 may convert coded signals into pixel signals for one or more displays 53 (e.g., display 12 and/or display 14). In some embodiments, as described further below, such coded signals for audio and/or video output may be provided by a docked mobile device. Display controller 52 and audio board 51 may be directly connected to parallel ports on game controller board 44. In some embodiments, the electronics on the various boards may be combined in any suitable way, such as onto a single board.

In some embodiments, as discussed above, a casino electronic gaming machine cabinet such as cabinet 10 may be configured with a dock 60 for receiving a mobile device 100 in the possession of a player in the casino venue, such that the mobile device 100 may supply processing resources for providing wagering game play (and/or other resources for enhancing the wagering game play) via the engaging input/output capabilities of the electronic gaming machine cabinet 10. Docking mobile device 100 to electronic gaming machine cabinet 10 may comprise establishing a communication channel between the two devices. The communication channel between mobile device 100 and electronic gaming machine cabinet 10 may be established through a wired interface in some embodiments. In other embodiments, the communication channel between mobile device 100 and electronic gaming machine cabinet 10 may be established through a wireless interface. With continued reference to FIG. 2, game controller board 44 may be connected to and in communication with dock 60. Dock 60 may comprise one or more connectors and/or interfaces to establish a communication channel with mobile device 100. Dock 60 may communicate with mobile device 100 via one or more communication interfaces 62, which may be capable of electronic communication with mobile device 100 via dock 60 while mobile device 100 executes the wagering game software that provides wagering game play to the player. Dock 60 and communication interface 62 may be configured to transmit and receive data bi-directionally.

In some embodiments, dock 60 may comprise a cradle or other receiving area shaped to accommodate mobile device 100. In some embodiments, a player may dispose his mobile device on the cradle of dock 60 prior to establishing a connection with electronic gaming machine cabinet 10. In some embodiments, the mobile device may be docked onto the cradle throughout the duration of a game being played.

Dock 60 may further comprise electric communication means to establish a connection with mobile device 100. By way of example and not limitation, dock 60 may comprise a USB port, an Ethernet port, an HDMI port, or any other suitable type of port to establish a wired communication channel with mobile device 100. Communication interface 62 may comprise a physical cable, connection pins, or any other suitable type of wiring means. In other embodiments, mobile device 100 may communicate with electronic gaming machine cabinet 10 via a wireless link. In such embodiments, dock 60 may comprise a Bluetooth port, a WiFi port, a Miracast port, a near field communication (NFC) port, or any other suitable type of wireless port. In such embodiments, communication interface 62 represents the wireless communication link established between dock 60 and mobile device 100.

Mobile device 100 is referred to herein as "docked to electronic gaming machine cabinet 10", "docked to dock 60", or simply "docked", when a communication channel between mobile device 100 and electronic gaming machine cabinet 10 is established, whether the two devices are in physical contact or not. As those of skill in the art will appreciate, mobile device 100 may be docked to electronic gaming machine cabinet 10, even when it is not disposed in physical contact to the cabinet. For example, the user may wirelessly play a wagering game executing on mobile device 100 and being displayed on electronic gaming machine cabinet 10 while holding the mobile device in one hand or while having the mobile device disposed in a pocket or a bag.

In some embodiments, electronic gaming machine cabinet 10 may charge a battery of mobile device 100, when mobile device 100 is docked.

In some embodiments, as discussed above, processing resources for executing wagering game software may be offloaded from an electronic gaming machine cabinet to a docked mobile device. For example, in some embodiments the wagering game content engine may run on the mobile device while the electronic gaming machine cabinet may be used by the player to enter commands to the game engine and/or to display the output from the game. In some embodiments, the player may enter input commands to the wagering game engine through a user interface on the cabinet, such as through player control buttons 39. In some such embodiments, game controller board 44 may function as control circuitry configured to receive wagering game input commands entered by the player via the input controls of the casino electronic gaming machine cabinet 10, and to transmit corresponding control signals to docked mobile device 100 via communication interface 62. In some embodiments, the control signals corresponding to the player's input commands entered via the casino electronic gaming machine cabinet 10 may be input to the wagering game software executing on the mobile device 100 to control the wagering game. The software corresponding to the wagering game program may be stored in a memory 120 of mobile device 100. Memory 120 may comprise a Flash memory unit, an EEPROM, a hard drive, a RAM unit or any other suitable processor-readable storage medium. Processor 110 may be configured to execute the processor-executable instructions stored in memory 120. Processor 110 may comprise a central processing unit (CPU). Processor 110 may further comprise a graphics processing unit (GPU), in some embodiments.

In some embodiments, the wagering gaming software executing on mobile device 100 may comprise execution of a random number generation (RNG) function to determine an outcome in a wagering game. The RNG may use a formula or an algorithm comprising a series of instructions for generating the random numbers. The formula or algorithm may be stored in memory 120. In some embodiments, the formula or algorithm associated to the RNG function may depend on the return to player (RTP) specific to the casino venue where the wagering game play takes place. Thus, in some embodiments, the electronic gaming machine cabinet 10 may communicate to docked mobile device 100 the required RTP for operation of the RNG function when docked to the electronic gaming machine cabinet 10 within the casino venue. The RTP of the casino venue in some cases may be imposed by the local jurisdiction.

In some embodiments, the raw result of the RNG function may be transmitted to the cabinet via communication interface 62. In other embodiments, processor 110 may process the result of the RNG function and may generate an outcome that comprises graphics output providing visual components of the wagering game play. The outcome of the wagering game play may be transmitted to electronic gaming machine cabinet 10 via communication interface 62. The outcome may be received at game controller board 44, which, in response, may control display controller 52 and/or audio board 51. Accordingly, the outcome of the game play may be signaled to the player via visual and/or audio content, depending on the specific game being played. Display controller 52 may adapt the coded signals representing the outcome of the game play to cause display(s) 53 to display a visual representation of the game play. Similarly, audio board 51 may adapt the coded signals representing the outcome of the game play to cause audio speaker(s) to play audio output associated to the outcome of the wagering game play.

In some embodiments, the user may elect to enter a set of input commands to the game engine through a user interface on the mobile device, for example through touchscreen 170, as illustrated in FIG. 2. Touchscreen 170 may include a TFT display, a keyboard, a keypad or any suitable set of physical or digital buttons. Based at least in part on the commands entered through the mobile device user interface, processor 110 may execute wagering game software and determine an outcome of the game play. The outcome of the game play may be transmitted to electronic gaming machine cabinet 10 via communication interface 62. Based on the outcome, game controller board 44 may produce and transmit visual output to display 53 and/or audio output to the speaker(s). In some embodiments, casino electronic gaming machine cabinet 10 may be configured to receive mobile device 100 in a dock that allows the touchscreen 170 of the mobile device 100 to replace a standard touchscreen of the casino electronic gaming machine cabinet 10. For example, in one implementation, touchscreen display 12 of casino electronic gaming machine cabinet 10 may be replaced by a dock configured to receive and hold a player's tablet computer in a position and orientation to function as the touchscreen interface of the casino electronic gaming machine cabinet 10, performing the same or similar functionality as the standard touchscreen display 12 ordinarily would in the absence of a docked touchscreen mobile device in the same location. In some embodiments, a smaller mobile device 100, for example, may be programmed, when docked at casino electronic gaming machine cabinet 10, to function as a touchpad for the electronic gaming machine, receiving touch input from the player on the mobile device 100's touchscreen 170 and translating the received touch input into touchpad input to the wagering game software executing on the mobile device 100 docked at the electronic gaming machine cabinet 10.

In some embodiments, as discussed above, no component of electronic gaming machine cabinet 10 may be configured to execute or provide wagering game play when no mobile device is docked at the cabinet. In such embodiments, in order to play a wagering game through electronic gaming machine cabinet 10, a mobile device would have to be docked. Following the establishment of a connection with a mobile device having wagering game software installed thereon, game controller board 44 may be configured to provide wagering game play in cooperation with processing resources on the mobile device, as described above.

In some embodiments, electronic gaming machine cabinet 10 may comprise a proximity sensor (not shown in FIG. 2). This proximity sensor may be configured, in some embodiments, to sense proximity of a person to the cabinet. For example, the proximity sensor may be configured to emit an electromagnetic field, a beam of electromagnetic radiation (such as infrared radiation) or an acoustic wave and to detect changes in the field or return signal. In response to detection of proximity of a person, when no mobile device is docked to dock 60, in some embodiments electronic gaming machine cabinet 10 may be configured to display, on display 53, an attract sequence designed to draw the person's attention so as to attract the person to dock a mobile device to electronic gaming machine cabinet 10 to play a wagering game. In some embodiments, in response to detection of proximity of a person, electronic gaming machine cabinet 10 may be configured alternatively or additionally to execute an attract audio sequence. Electronic gaming machine cabinet 10 may be configured to execute the attract sequence (visual and/or audio) when a person is within any suitable threshold distance from the cabinet, such as a range of less than 10 meters, less than 5 meters, less than 2 meters, or any other suitable distance.

In some embodiments, alternatively or additionally, mobile device 100 may comprise a proximity sensor, such as proximity sensor 160. Proximity sensor 160 may be configured to sense proximity of a person to the cabinet when the mobile device 100 is docked. For example, the proximity sensor may be configured to emit an electromagnetic field, a beam of electromagnetic radiation (such as infrared radiation) or an acoustic wave and to detect changes in the field or return signal. Proximity sensor 160 may operate when mobile device 100 is docked to dock 60. In some embodiments, in response to detection of proximity of a person other than the player to electronic gaming machine cabinet 10, proximity data may be supplied to game controller board 44 by mobile device 100. In response, game controller board 44 may execute a visual and/or audio attract sequence to draw the person's attention so as to attract him/her to also play a wagering game on the electronic gaming machine cabinet 10. The second player may be allowed to play after the completion of the current wagering game by the first player, or in parallel (for example in multi-player mode).

In some embodiments, proximity data may be received from proximity sensor 160 at game controller board 44 during wagering game play to determine the distance between the player and the cabinet. The distance data may be received via communication interface 62. The measured distance may be used by game controller board 44 to adjust a parameter of 3D visual content displayed on display 53.

For example, in embodiments using an autostereoscopic 3D display, a distance measurement determined using proximity sensor 160 may be used to tune the display to project the autostereoscopic image accurately to the computed location of the player's head and/or eyes.

In some embodiments, the data received at game controller board 44 from proximity sensor 160 may be used by game controller board 44 to accurately determine the beginning and end of wagering game play sessions, e.g., by detecting when additional players approach and leave the electronic gaming machine cabinet 10.

In some embodiments, mobile device 100 may comprise a light sensor, such as light sensor 180. Light sensor 180 may comprise a photodiode, a bolometer, a photoresistor, and/or any other suitable sensor sensitive to photons. Light sensor 180 may detect the brightness and/or temperature of the light illuminating mobile device 100 when mobile device 100 is docked to electronic gaming machine cabinet 10 via dock 60. In some embodiments, game controller board 44 may be configured to receive data from light sensor 180 via communication interface 62. Based on the data received by light sensor 180, game controller board 44 may adjust at least one display quality parameter of display 53. Any suitable display adjustment may be performed. By way of example and not limitation, based on the data received from light sensor 180, game controller board 44 may adjust the brightness and/or contrast of display 53, e.g., to make the display 53 optimally viewable given the current lighting conditions of the environment around electronic gaming machine cabinet 10.

In some embodiments, mobile device 100 may comprise an accelerometer, such as accelerometer 140. Accelerometer 140 may comprise a piezoelectric, piezoresistive, capacitive, or any other suitable type of accelerometer. Accelerometer 140 may further comprise a micro electro-mechanical system (MEMS). Game controller board 44 may be configured to receive acceleration data from accelerometer 140 via communication interface 62 when mobile device 100 is docked to dock 60. The data received may be used, in some embodiments, for tilt detection and and/or for motion detection to enable control of wagering game play. In some embodiments, acceleration data may be used to detect when the electronic gaming machine cabinet 10 is being moved in an unauthorized manner, and to trigger an appropriate response (such as, e.g., deactivating the wagering game).

In some embodiments, mobile device 100 may comprise a camera, such as camera 150. Camera 150 may comprise a CCD camera, a CMOS camera, or any other suitable type of camera. Game controller board 44 may be configured to receive video data from camera 150 via communication interface 62 when mobile device 100 is docked to dock 60. In some embodiments, game controller board 44 (and/or processor 110) may be configured to detect a gesture made by the player, based on video captured by camera 150. The gesture may be one among a library of allowed gestures for controlling a wagering game. Each of the various gestures may be associated to a specific control input for the wagering game software executing on the docked mobile device. In response to detecting a recognized gesture, game controller board 44 may be configured, in some embodiments, to enter the corresponding control input to the wagering game software engine. In other embodiments, in response to detecting a recognized gesture, processor 110 may be configured to enter the corresponding control input to the wagering game software engine.

In some embodiments, a photograph (and/or a video) of the player playing the wagering game via docked mobile device 100 may be provided. The photograph may have been captured by camera 150 as the player plays the wagering game, or previously. The photograph may be stored in memory 120. In some embodiments, game controller board 44 may be configured to retrieve the photograph of the player from mobile device 100 via communication interface 62. Game controller board 44 may be further configured to upload the photograph of the player playing the wagering game to a server system of the casino venue, such as host system 41. Game controller board 44 may upload the photograph to a memory of host system 41 via communications board 42. In other embodiments, host system 41 may upload the photograph via a direct connection with mobile device 100.

In some embodiments, the photograph may be used by host system 41 as a form of player identification. The photograph may be linked to an account associated to the player. The account associated to the player may further contain, in a memory of host system 41, personal information in regard to the player's gaming preferences and/or patterns. Host system 41 may also record the player's historical win/loss statistics. In some embodiments, host system 41 may post one or more photographs of a player playing the wagering game, taken via camera 150 of docked mobile device 100, to social media and/or other sites, for social and/or promotional purposes.

In some embodiments, game controller board 44 may be configured to access personal information of the player via communication interface 62 while mobile device 100 is docked. Game controller board 44 may access mobile device 100 and download personal information in regard to the player's gaming preferences and patterns, historical statistics, player location, age, game saves and/or payment history. In other embodiments, such information may be accessed from mobile device 100 by host system 41 via a direct connection. In some embodiments, the player may be enabled to set each item of personal data to "visible" or "hidden" from the casino venue. The personal information may be downloaded from memory 120. Alternatively or additionally, in some embodiments a player's personal information may be derived from the player's social networking account, via mobile device 100. In this case, game controller board 44 and/or host system 41 in some embodiments may request permission to access the player's social networking account. Based on the information obtained through the player's mobile device memory and/or through the player's social networking accounts, host system 41 may be configured to provide wagering game recommendations to the player and/or to transmit personalized wagering game offerings. Host system 41 may select wagering game software, from a library of wagering game software, for the player based at least in part on the player's personal information. The selected wagering game software may be transmitted to the player's mobile device from host system 41 directly or via game controller board 44. The information obtained through the player's mobile device memory and/or through the player's social networking accounts in some embodiments may be stored in a memory of host system 41.

In some embodiments, personal information obtained from the player's mobile device may be used alternatively or additionally to personalize the gaming experience. By way of example and not limitation, personalized adjustments may be made to the brightness of display 53, the volume associated to speaker(s) connected to audio board 51, language setting, reel-spin timing, win presentation, win-meter increment algorithm or speed of game play. Such gaming parameters may be adjusted according to the player's preferences and/or based on a history of geographical locations visited by the player carrying mobile device 100. In some embodiments, the current geographical location and/or a history of geographical locations the player has visited may be obtained through a global positioning system (GPS) unit of the player's mobile device, such as GPS 130. Data representing the player's geographical information may be obtained from GPS 130 via communication interface 62, and/or via a direct connection with host system 41. Based on the player's history of geographical locations, host system 41 in some embodiments may generate a wagering game offering personalized to the player. The game offering may be transmitted to the player's mobile device from host system 41 directly or via game controller board 44. For example, a personalized wagering game offering may include a skin for a wagering game having a relation to a place frequently visited by the player, or a recommendation of a wagering game having a theme related to a place frequently visited by the player, or a credit toward a retail establishment frequented by the player as a bonus win or other payout from a wagering game, etc.

In some embodiments, electronic gaming machine cabinet 10 may comprise more than one dock and more than one communication interface. Each dock may be configured to establish a communication channel with a mobile device via a communication interface. A multi-dock cabinet of the type described herein may be used as a multi-player station, such that a plurality of players may simultaneously play a wagering game during a single gaming session. During a multi-player wagering gaming session, game controller board 44 may be configured to receive input commands from the cabinet's user interface, such as from player control buttons 39 and/or from a touchscreen of the plurality of mobile devices docked to the cabinet. Regardless of how the input commands are generated, any one, some, or all of the processors of the mobile devices may execute wagering game multi-player software. In some embodiments, the processor(s) of the mobile device(s) receiving the input commands may execute the software. Win/loss outcomes may be transmitted to the cabinet and to the other mobile devices via communication interface 62, and may be displayed on display 53.

Figure 3:
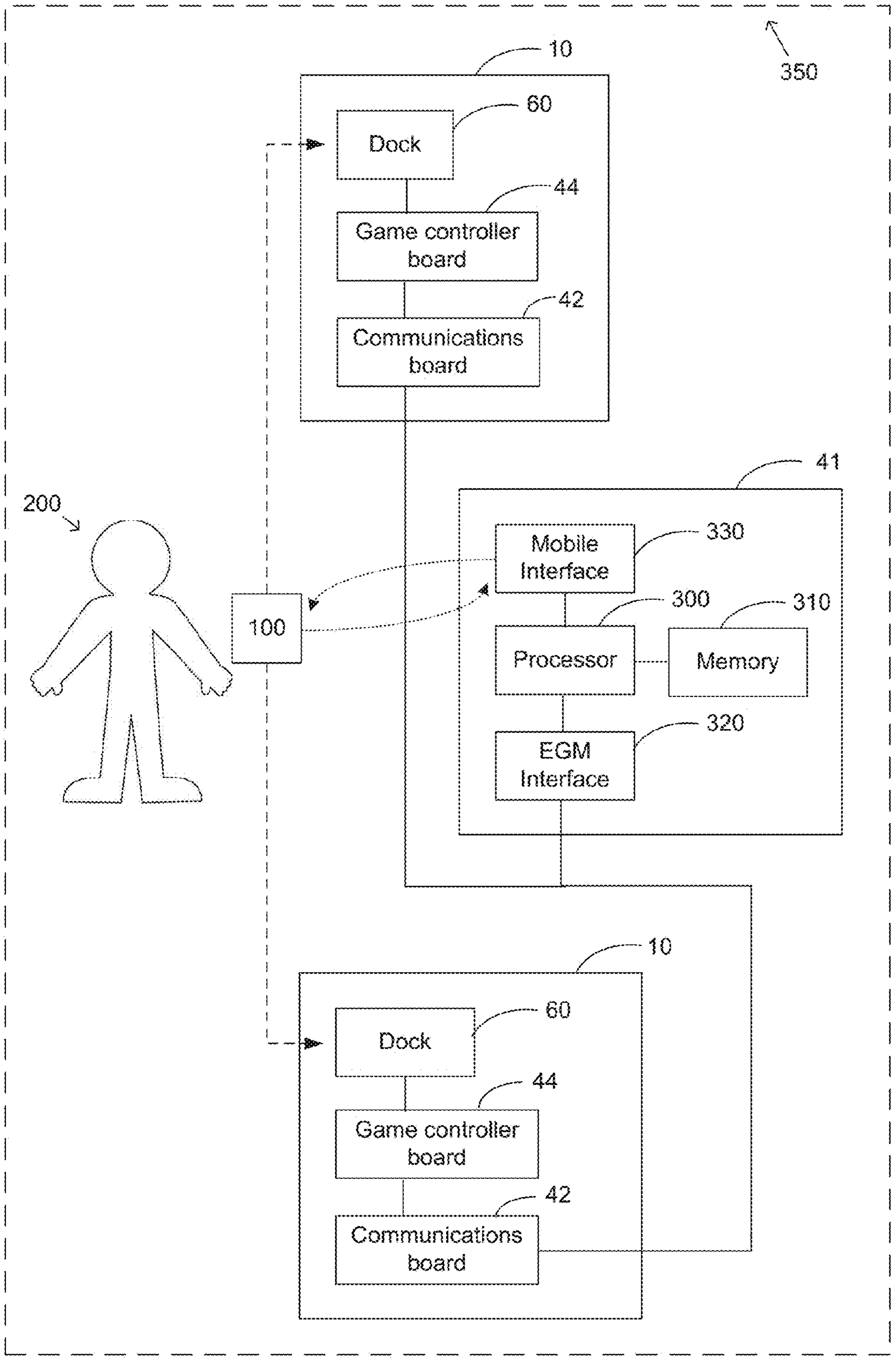
FIG. 3 is a block diagram of a system in a casino venue providing wagering game play to a player in accordance with some embodiments.

FIG. 3 illustrates an example of a casino venue comprising a host system 41 and a plurality of electronic gaming machine cabinets 10 of the type described in connection with FIG. 2. While FIG. 3 depicts two electronic gaming machine cabinets 10, it should be appreciated that a casino venue may host any suitable number of electronic gaming machine cabinets of the type described herein. Dashed box 350 in the example of FIG. 3 represents a boundary of the casino venue. As shown, host system 41 and the plurality of electronic gaming machine cabinets 10 are located within casino venue boundary 350. In some embodiments, the casino venue's boundary may be defined by the boundary of the casino venue's building. In other embodiments, the casino venue's boundary may be defined by the boundary of a specific area of the casino venue, such as the room(s) hosting the electronic gaming machine cabinets 10. However, the casino venue's boundary may be defined in any suitable manner. In some embodiments, there may be multiple different boundaries within a casino venue, such as a boundary surrounding the slot machine area in the casino venue, a boundary surrounding the poker area in the casino venue, boundaries created by the ranges of different wireless networks to host systems 41, etc.

In some embodiments, each of a plurality of electronic gaming machine cabinets 10 in a casino venue may be in communication with the casino's host system 41. The communication may be established via wired connections and/or wirelessly. Host system 41 may comprise EGM interface 320 configured to establish a communication channel with each of the communication boards 42 of the electronic gaming machine cabinets 10. EGM interface 320 may comprise one or more LAN ports, Ethernet ports, USB ports, WiFi ports, Bluetooth ports, or any other suitable port(s) and/or connector(s) enabling communication between the host system and the cabinets. Host system 41 may further comprise a processor 300, a memory 310 and a mobile interface 330. Processor 300 may comprise a CPU, a GPU and/or any other suitable processing hardware capable of executing a computer program. In some embodiments, processor 300 may comprise a multiprocessor system. Memory 310 may comprise RAM, ROM, EEPROM, flash memory, and/or any other memory technology, CD-ROM, digital versatile disks (DVD), and/or any other optical disk storage, magnetic cassettes, magnetic tape, magnetic disk storage, and/or any other magnetic storage device, and/or any other media which can be used to store information and which can accessed by processor 300. Mobile interface 330 may comprise hardware to establish a wireless communication channel with a mobile device 100 of the type described in connection with FIG. 2. By way of example but not limitation, mobile interface 330 may comprise a WiFi port, a Bluetooth port, and/or any other suitable port and/or interface to transmit data to and/or receive data from mobile device 100.

FIG. 3 further illustrates player 200 who is in possession of mobile device 100. Player 200 may carry a mobile device 100 of the type described in connection with FIG. 2 around the casino floor and within the casino venue's boundary 350. Player 200 may dock mobile device 100 to any one of electronic gaming machine cabinets 10 located on the casino venue floor, and may move the mobile device 100 from cabinet to cabinet as desired to obtain different experiences.

In some embodiments, mobile device 100 may be in direct wireless communication with host system 41 via mobile interface 330. Mobile device 100 may synchronize to host system 41 when a communication channel is established, such that gaming information associated with player 200 may be transmitted via mobile interface 330 and stored in memory 310, in some embodiments. Processor 300 of host system 41 may be configured in some embodiments to access player 200's personal information via mobile interface 330 and to select wagering game software for player 200 based at least in part on player 200's personal information. Processor 300 may be further configured to transmit the selected wagering game software to mobile device 100 via mobile interface 330. The wagering game software may be executed on mobile device 100 in stand-alone mode or in connection with an electronic gaming machine cabinet 10 via dock 60.

In some embodiments, host system 41 may access mobile device 100 to check whether wagering game software comprises one or more software updates. If host system 41 determines that the software is not updated, host system 41 may request permission to transmit a software update to mobile device 100. Alternatively or additionally, in some embodiments host system 41 may send gaming recommendations to mobile device 100 via interface 330 based on player 200's personal information. If host processor 300 determines that the recommended game is not installed on mobile device 100, host system 41 may further request permission to download the game software via mobile interface 330 to mobile device 100.

In some embodiments, host system 41's resources may be utilized by mobile device 100 for execution of wagering gaming software. By way of example and not limitation, processor 300 of host system 41 may execute RNG functions and provide wagering game win/loss outcomes to mobile device 100 via mobile interface 330. This may be useful for mobile devices having limited or outdated computational capacity. Accordingly, in some embodiments the mobile device computational capacity may be extended to include resources of processor 300 of host system 41.

In some embodiments, host system 41 may obtain data regarding present and/or past locations of mobile device 100. For example, host system 41 may obtain location data from the mobile device's GPS unit 130 via mobile interface 330. Alternatively or additionally, in some embodiments host system 41 may obtain location data from a cellular network unit of mobile device 100 (not shown in FIG. 2), and/or from a WiFi unit (not shown in FIG. 2), via mobile interface 330. The location data may be used by host system 41 to determine whether mobile device 100 is within the casino venue's boundary 350. In some embodiments, host system 41 may enable a wagering game on mobile device 100 when mobile device 100 is within casino venue boundary 350 and disable the wagering game when mobile device 100 is outside casino venue boundary 350. In some embodiments, mobile device 100 may be configured to execute game software running in a limited mode when mobile device 100 is outside casino venue boundary 350. When playing in such a limited mode, player 200 may have access to a portion of the features provided by the game in the full in-venue mode. For example, in some embodiments, wagering may be entirely disabled when the limited-mode wagering game is played on mobile device 100 outside of casino venue boundary 350 (thus operating in "free-play mode"). In another example, the wagering function may be enabled, but only to wager fictional credit points. The inventors have appreciated that for some games, it may desirable to allow players to play in a limited mode when they are outside a casino venue, as this may give players the opportunity to become acquainted with (and hopefully attached to) the game before playing in full wagering mode in a casino venue.

In some embodiments, wagering allowability may not be changed based on mobile device 100 being in-venue or out-of-venue, but in response to determining that mobile device 100 has moved from outside the casino venue's boundary 350 to inside the casino venue's boundary 350, host system 41 may be configured to change at least one other parameter of the wagering game software. This may be done, in some embodiments, in a way that makes the wagering game more engaging when played within the casino venue, for example by causing the game to produce larger payouts. By way of example and not limitation, in response to determining that mobile device 100 has moved from outside the casino venue's boundary 350 to inside the casino venue's boundary 350, host system 41 may be configured in some embodiments to change (e.g., increase) a return-to-player (RTP) parameter, a payout size parameter, an operator percentage parameter (e.g., the house "take") and/or a bonus trigger parameter of the wagering game.

In some embodiments, host system 41 may use location data obtained via mobile interface 330 to determine the present and/or past geographical location, such as country or state, of mobile device 100. As described previously, geographical data may be used in some embodiments to provide a wagering game offering and a gaming experience that is personalized to each player. By way of example and not limitation, in some embodiments host system 41 may adjust the brightness of the electronic gaming machine cabinet's display and/or the volume of the cabinet's speaker(s) to which mobile device 100 is docked, in accordance with local customs in a particular locale.

Alternatively or additionally, based on mobile device 100's geographical location, host system 41 may be configured to change at least one parameter of the wagering game software, such as a return-to-player (RTP) parameter, a payout size parameter, an operator percentage parameter or a bonus trigger parameter of the wagering game. Accordingly, different countries or states may operate under different jurisdictions, that may dictate specific parameters or parameter ranges.

In some embodiments, based on the player's personal information and/or the player's geographical data, host system 41 may provide, via mobile interface 330, marketing content to the player. Marketing content may include advertising and promotions from vendors and merchants. By way of example and not limitation, host system 41 may send special deals offered to players by the restaurant located near the casino venue, or for restaurants/shops/etc. that the player has frequented in the past, etc.

Figure 4:
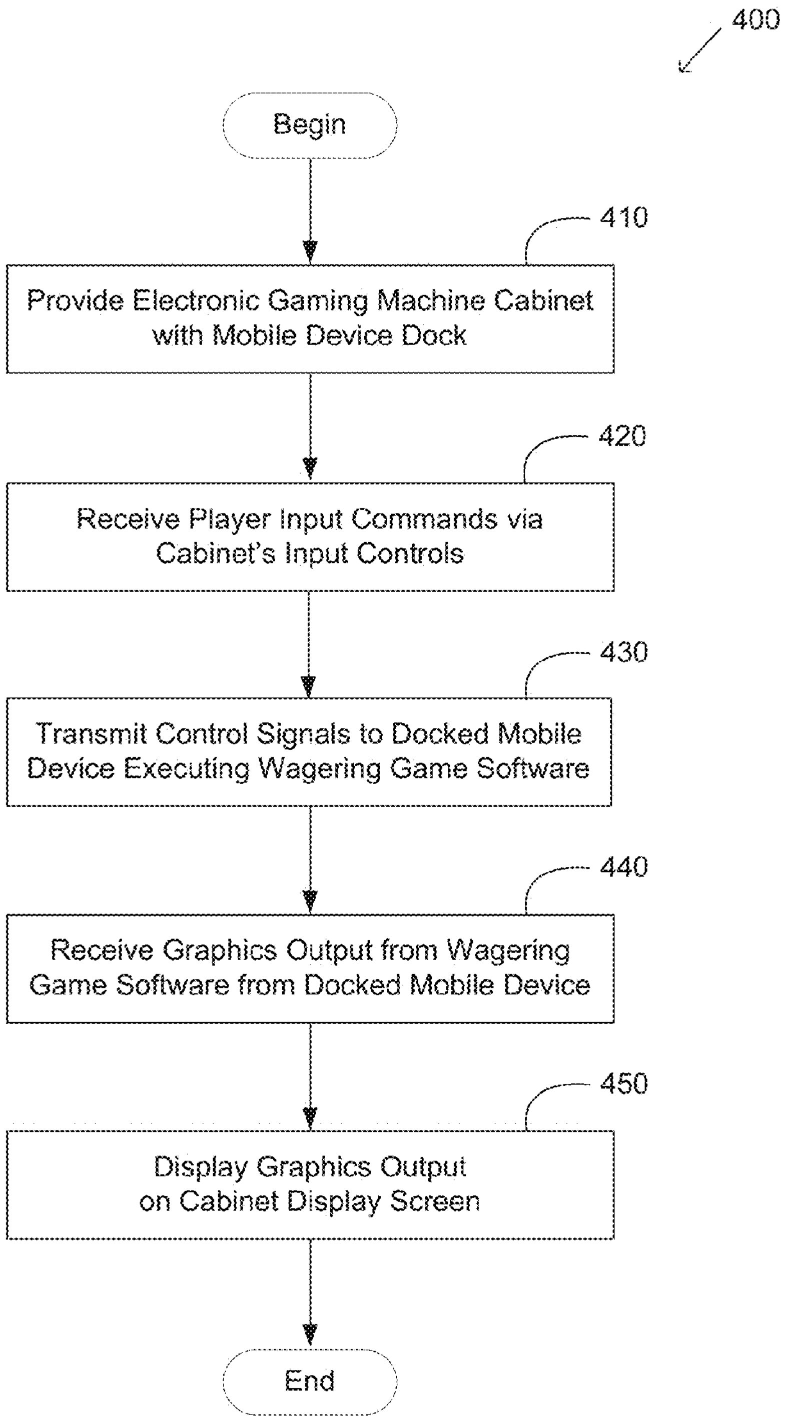
FIG. 4 is a flowchart illustrating an exemplary method of providing wagering game play to a player having a mobile device in a casino venue in accordance with some embodiments.

It should be appreciated from the foregoing that one embodiment is directed to a method 400 for providing wagering game play in a casino venue, as illustrated in FIG. 4. Method 400 begins at act 410, at which a casino electronic gaming machine cabinet including a dock for a player's mobile device may be provided. At act 420, wagering game input commands may be received, entered by the player via the input controls of the casino electronic gaming machine cabinet. At act 430, control signals corresponding to the received player input commands may be transmitted from the casino electronic gaming machine cabinet to the player's mobile device while the mobile device is docked at the casino electronic gaming machine cabinet. The control signals may be configured to provide control input to wagering game software executing on the player's docked mobile device, in accordance with the player input commands received. At act 440, graphics output providing visual components of the wagering game play from the wagering game software may be received at the casino electronic gaming machine cabinet from the player's docked mobile device, and this graphics output may be displayed on one or more display screens of the casino electronic gaming machine cabinet at act 450.

Figure 5:
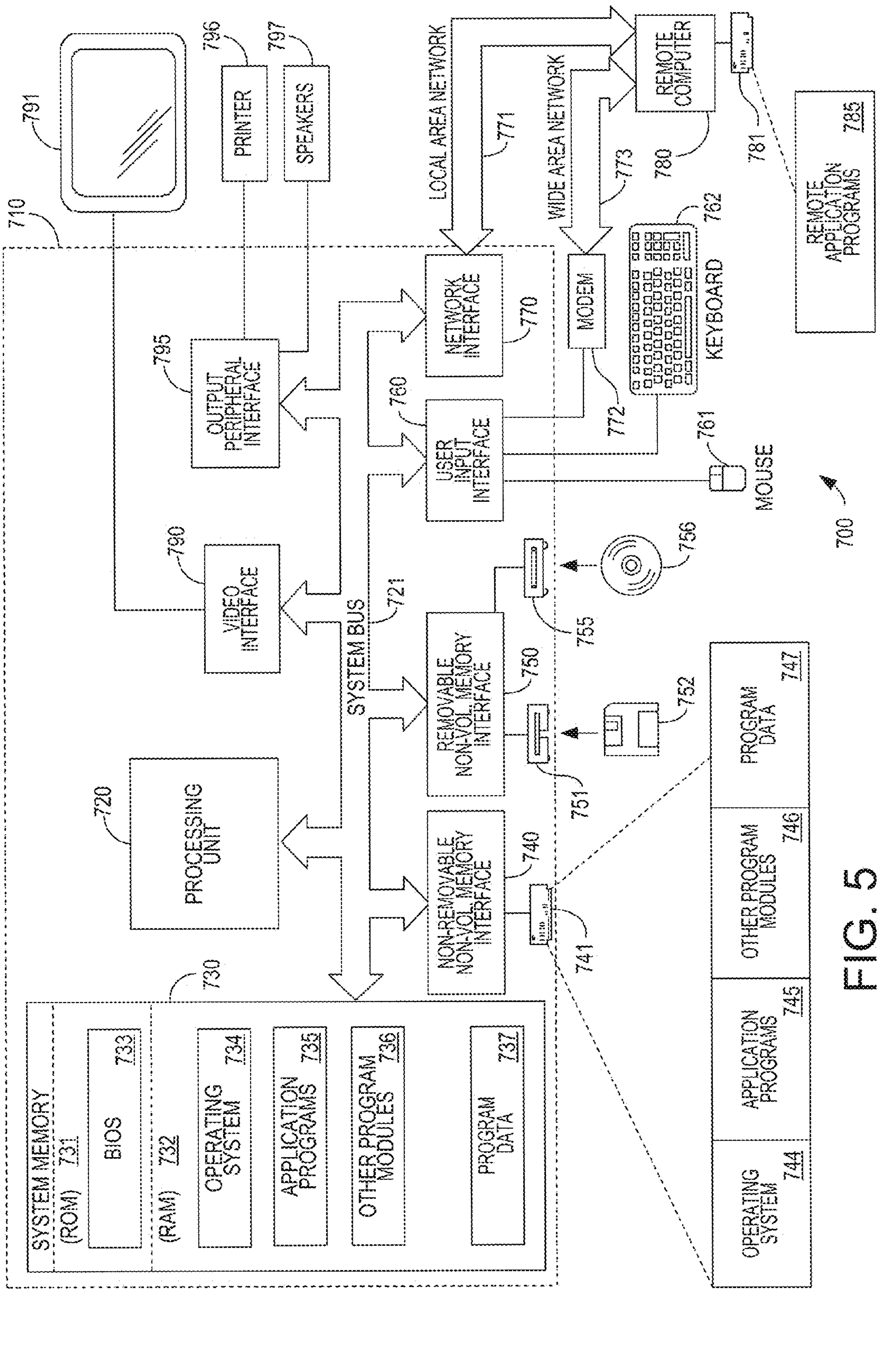
FIG. 5 is a schematic diagram of an exemplary computing environment in which some embodiments may be implemented.

FIG. 5 illustrates an example of a suitable computing system environment 700 in which some embodiments may be implemented. Components of this computing system may be representative of computing system components that may allow a mobile device, alone or in conjunction with a casino electronic gaming machine cabinet and/or a casino venue's server system to implement the described techniques. However, it should be appreciated that the computing system environment 700 is only one example of a suitable computing environment and is not intended to suggest any limitation as to the scope of use or functionality of the described embodiments. Neither should the computing environment 700 be interpreted as having any dependency or requirement relating to any one or combination of components illustrated in the exemplary operating environment 700. For example, some embodiments of a computing system usable with techniques described herein may include more or fewer components than illustrated in the example of FIG. 5.

Embodiments are operational with numerous other computing system environments or configurations. Examples of well-known computing systems, environments, and/or configurations that may be suitable for use with the described techniques include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the described techniques includes a computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 5 illustrates operating system 734, application programs 735, other program modules 736, and program data 737.

The computer 710 may also include other removable/non-removable, volatile/nonvolatile computer storage media. By way of example only, FIG. 5 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 5 provide storage of computer readable instructions, data structures, program modules and other data for the computer 710. In FIG. 5, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, touchscreen, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 5. The logical connections depicted in FIG. 5 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 5 illustrates remote application programs 785 as residing on memory device 781. It will be appreciated that the network connections shown are exemplary and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory processor-readable medium) encoded with a computer program (i.e., a plurality of instructions), which, when executed on one or more processors, performs at least the above-discussed functions. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A casino electronic gaming machine cabinet comprising:

at least one display screen;

a plurality of input controls;

a dock configured to receive a player's mobile device;

at least one communication interface capable of electronic communication with the player's mobile device via the dock while the player's mobile device executes wagering game software providing wagering game play to the player; and control circuitry configured to:

receive wagering game input commands entered by the player via the plurality of input controls of the casino electronic gaming machine cabinet;

transmit, to the player's mobile device via the at least one communication interface while the player's mobile device is docked at the casino electronic gaming machine cabinet, control signals corresponding to the received wagering game input commands, the control signals being configured to provide control input to the wagering game software executing on the player's docked mobile device;

receive from the player's docked mobile device, via the at least one communication interface, graphics output from the wagering game software providing visual components of the wagering game play;

display, on the at least one display screen of the casino electronic gaming machine cabinet, the graphics output from the wagering game software executing on the player's docked mobile device;

receive data from a light sensor of the player's docked mobile device via the at least one communication interface; and adjust, based at least in part on the data received from the light sensor of the player's docked mobile device, at least one display quality parameter of the at least one display screen of the casino electronic gaming machine cabinet.

2. The casino electronic gaming machine cabinet of claim 1, wherein the mobile device executing wagering game software providing wagering game play to the player comprises the mobile device performing at least one random number generation function in providing the wagering game play to the player.

3. The casino electronic gaming machine cabinet of claim 1, further comprising at least one audio speaker, wherein the control circuitry is further configured to:

receive from the player's docked mobile device, via the at least one communication interface, audio output from the wagering game software providing audio components of the wagering game play; and play, via the at least one audio speaker of the casino electronic gaming machine cabinet, the audio output from the wagering game software executing on the player's docked mobile device.

4. The casino electronic gaming machine cabinet of claim 1, wherein no component of the casino electronic gaming machine cabinet is configured to provide wagering game play when no mobile device is docked at the casino electronic gaming machine cabinet.

5. The casino electronic gaming machine cabinet of claim 4, further comprising a proximity sensor configured to detect proximity of a person to the casino electronic gaming machine cabinet, wherein the control circuitry is further configured to display on the at least one display screen an attract sequence in response to detection of proximity of a person to the casino electronic gaming machine cabinet when no mobile device is docked at the casino electronic gaming machine cabinet.

6. The casino electronic gaming machine cabinet of claim 1, wherein the control circuitry is further configured to:

receive data from a proximity sensor of the player's docked mobile device via the at least one communication interface; and detect proximity of one or more persons other than the player to the casino electronic gaming machine cabinet based at least in part on the data received from the proximity sensor of the player's docked mobile device.

7. The casino electronic gaming machine cabinet of claim 1, wherein the control circuitry is further configured to:

receive data from an accelerometer of the player's docked mobile device via the at least one communication interface; and detect, from the accelerometer data received from the player's docked mobile device, when the casino electronic gaming machine cabinet is being moved in an unauthorized manner.

8. A method of providing wagering game play to a player having a mobile device in a casino venue, the method comprising:

providing in the casino venue a casino electronic gaming machine cabinet comprising at least one display screen, a plurality of input controls, a dock configured to receive the player's mobile device, and at least one communication interface capable of electronic communication with the player's mobile device via the dock while the mobile device executes wagering game software providing wagering game play to the player;

receiving, at the casino electronic gaming machine cabinet, wagering game input commands entered by the player via the input controls of the casino electronic gaming machine cabinet;

transmitting, from the casino electronic gaming machine cabinet to the player's mobile device via the at least one communication interface while the player's mobile device is docked at the casino electronic gaming machine cabinet, control signals corresponding to the received wagering game input commands, the control signals being configured to provide control input to the wagering game software executing on the player's docked mobile device;

receiving, at the casino electronic gaming machine cabinet from the player's docked mobile device via the at least one communication interface, graphics output from the wagering game software providing visual components of the wagering game play;

displaying, on the at least one display screen of the casino electronic gaming machine cabinet, the graphics output from the wagering game software executing on the player's docked mobile device; and in response to determining that the mobile device has moved from outside a boundary of the casino venue to inside the boundary of the casino venue, changing at least one parameter of the wagering game software, including changing at least one aspect of the wagering game play other than wagering allowability.

9. The method of claim 8, wherein changing at least one parameter of the wagering game software comprises changing at least one parameter selected from the group consisting of a return-to-player (RTP) parameter, a payout size parameter, an operator percentage parameter, and a bonus trigger parameter of the wagering game in response to determining that the mobile device has moved from outside the casino venue boundary to inside the casino venue boundary.

10. The method of claim 8, further comprising:

accessing data from a global positioning system (GPS) unit of the player's mobile device, the data indicating a history of geographical locations visited by the player carrying the mobile device;

generating a wagering game offering personalized to the player based on the history of geographical locations visited by the player; and transmitting the personalized wagering game offering to the player's mobile device from a server system of the casino venue.

11. The method of claim 8, further comprising:

accessing personal information of the player via the player's mobile device;

selecting wagering game software for the player based at least in part on the personal information of the player accessed via the player's mobile device; and transmitting the selected wagering game software to the player's mobile device from a server system of the casino venue.

12. The method of claim 8, further comprising uploading from the player's mobile device to a server system of the casino venue a photograph, captured by a camera of the mobile device, of the player playing the wagering game via the docked mobile device.

13. The method of claim 8, further comprising:

receiving data from an accelerometer of the player's docked mobile device via the at least one communication interface; and detecting, from the accelerometer data received from the player's docked mobile device, when the casino electronic gaming machine cabinet is being moved in an unauthorized manner.

14. The method of claim 8, further comprising:

receiving data from a proximity sensor of the player's docked mobile device via the at least one communication interface; and detecting proximity of one or more persons other than the player to the casino electronic gaming machine cabinet based at least in part on the data received from the proximity sensor of the player's docked mobile device.

15. At least one non-transitory processor-readable storage medium storing processor-executable instructions that, when executed by at least one processor of a player's mobile device, perform a method of providing wagering game play to the player while the mobile device is docked at a casino electronic gaming machine cabinet, the method comprising:

receiving, from the casino electronic gaming machine cabinet, control signals corresponding to wagering game input commands entered by the player via input controls of the casino electronic gaming machine cabinet, the control signals being configured to provide control input to wagering game software executing on the docked mobile device;

executing the wagering game software at the mobile device using the control input from the control signals received from the casino electronic gaming machine cabinet, wherein executing the wagering game software comprises performing at least one random number generation function in providing the wagering game play to the player;

transmitting, to the casino electronic gaming machine cabinet, graphics output from the wagering game software providing visual components of the wagering game play for display on a display of the casino electronic gaming machine cabinet; and detecting, using a camera of the mobile device, at least one gesture made by the player; and using the at least one gesture detected by the mobile device's camera as a control input for the wagering game software executing on the docked mobile device.

16. The at least one non-transitory processor-readable storage medium of claim 15, wherein the method further comprises:

receiving touch input from the player on a touchscreen of the docked mobile device; and translating the received touch input into touchpad input to the wagering game software.

17. The at least one non-transitory processor-readable storage medium of claim 15, wherein the method further comprises:

receiving data from an accelerometer of the player's docked mobile device via the at least one communication interface; and detecting, from the accelerometer data received from the player's docked mobile device, when the casino electronic gaming machine cabinet is being moved in an unauthorized manner.

18. The at least one non-transitory processor-readable storage medium of claim 15, wherein the method further comprises:

receiving data from a proximity sensor of the player's docked mobile device via the at least one communication interface; and detecting proximity of one or more persons other than the player to the casino electronic gaming machine cabinet based at least in part on the data received from the proximity sensor of the player's docked mobile device.

19. The at least one non-transitory processor-readable storage medium of claim 15, wherein the method further comprises uploading from the player's mobile device to a server system of a casino venue that includes the casino electronic gaming machine cabinet, a photograph, captured by the camera of the mobile device, of the player playing the wagering game via the docked mobile device.

* * * * *